United States Patent
Kwon et al.

(10) Patent No.: US 8,094,375 B2
(45) Date of Patent: *Jan. 10, 2012

(54) IODINE-TYPE POLARIZER, POLARIZING PLATE AND METHOD FOR PRODUCING THEREOF

(75) Inventors: Ki-Ok Kwon, Daejeon (KR); Kyun-Il Rah, Daejeon (KR); Seung-Ae Kim, Daejeon (KR); Jeong-Woo Shon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 215 days.

This patent is subject to a terminal disclaimer.

(21) Appl. No.: 12/226,104

(22) PCT Filed: Feb. 4, 2008

(86) PCT No.: PCT/KR2008/000684
§ 371 (c)(1),
(2), (4) Date: Oct. 8, 2008

(87) PCT Pub. No.: WO2008/097004
PCT Pub. Date: Aug. 14, 2008

(65) Prior Publication Data
US 2009/0290215 A1    Nov. 26, 2009

(30) Foreign Application Priority Data
Feb. 9, 2007  (KR) .................. 10-2007-0013737

(51) Int. Cl.
*G02B 5/30* (2006.01)
(52) U.S. Cl. .................. 359/487.02; 264/1.31; 264/1.34
(58) Field of Classification Search .......... None
See application file for complete search history.

(56) References Cited

U.S. PATENT DOCUMENTS

| 5,087,985 A | * | 2/1992 | Kitaura et al. ............. 359/350 |
| 2005/0073065 A1 | | 4/2005 | Mack et al. |
| 2005/0195348 A1 | * | 9/2005 | Saitoh et al. ................ 349/118 |
| 2009/0306293 A1 | * | 12/2009 | Kim et al. ................... 525/56 |

FOREIGN PATENT DOCUMENTS

| JP | 4-173847 | 6/1992 |
| JP | 2004-341503 | 12/2004 |
| JP | 2006-509251 | 3/2006 |
| KR | 10-2003-0026765 | 4/2003 |
| KR | 1020030083518 | 10/2003 |
| KR | 1020050063692 | 6/2005 |
| KR | 10-2006-0014372 | 2/2006 |
| WO | WO 2004/094510 | 11/2004 |

\* cited by examiner

*Primary Examiner* — Lee Fineman
(74) *Attorney, Agent, or Firm* — McKenna Long & Aldridge LLP

(57) ABSTRACT

There is provided a method for producing a polarizer having improved cross transmittance. The method for producing a polarizer includes: dyeing a polyvinyl alcohol (PVA)-based film with molecular iodine by immersing the PVA-based film in an aqueous iodine solution (a dyeing step); absorbing the molecular iodine into the PVA-based film using an aqueous boric acid solution (a cross-linking step); arranging the molecular iodine in the certain direction by stretching the PVA-based film in a certain direction (an stretching step); and drying, in an oven, the PVA-based film in which the molecular iodine is oriented; wherein a phosphate compound is added to the iodine aqueous solution (the dyeing step) or the aqueous boric acid solution (the stretching step) so that a weight ratio of the boric acid: the phosphate compound is in a range of 1:0.1 to 1:10.

11 Claims, No Drawings

IODINE-TYPE POLARIZER, POLARIZING PLATE AND METHOD FOR PRODUCING THEREOF

This application claims the benefit of PCT/KR2008/000684 filed on Feb. 4, 2008 and also Korean Patent Application No. 10-2007-0013737 filed on Feb. 9, 2007, the contents of which is hereby incorporated herein by reference in their entirety.

TECHNICAL FIELD

The present invention relates to methods for producing an iodine-type polarizer and a polarizing plate, and more particularly, to a polarizer and a polarizing plate having improved cross transmittance capable of realizing high brightness and high contrast ratio, and a method for producing thereof.

BACKGROUND ART

A polarizer is a device that produces a polarized light from natural light, wherein the polarized light has a vibration plane in a certain direction and the natural light has a vibration plane in all directions. The polarizer may be divided into an iodine-type polarizer, a dye-type polarizer, a metal-type polarizer, a polyvinylene-type polarizer, an infrared polarizer, etc. Among them, the metal-type polarizer remains to be studied, and the iodine-type polarizing film and the dye-type polarizing film are practically used and commercially available.

The iodine-type polarizing film or the dye-type polarizing film is produced by dyeing a polyvinyl alcohol (PVA)-based film with dichroic iodine, dichroic dye or the like and orienting the dyed PVA-based film in a certain direction using a method such as uniaxial stretching, etc., and has been widely used in LCD industry, etc.

Recently, there have been various attempts to improve an image quality of LCD products as a variety of the LCD products are on the market and there is an increasing demand for the LCD products.

First of all, the white brightness, which controls of brightness of a screen, and the contrast ratio should be high in order to realize a high-definition. The white brightness refers to brightness of the light passed through a polarizing plate, and thus it is difficult to display a high-quality image when the white brightness is low since screen gets dark. Meanwhile, the contrast ratio (CR) represents a brightness ratio of a white state to a black state that is displayed through a pattern generator. Therefore, it is possible to display an image that is close to the original colors as the contrast ratio increases. In this case, the white brightness means brightness of the light emitted through two parallel polarizing plates, and the black brightness means brightness of the light emitted through two polarizing plates in cross. In order to enhance the white brightness, a method for increasing transmission of the light by reducing an amount of a dye that is used to dye a PVA film has been widely used in the art. That is, the black brightness is also increased since the amount of the transmitted light is increased with a decreasing amount of dye absorbed to the PVA film. In this case, a contrast ratio represented by the ratio of the white brightness to the black brightness is decreased since a value of the black brightness is increased in a higher range than a value of the white brightness.

Therefore, it is impossible to realize a clear color image since the brightness of a screen is improved but its contrast ratio is low as the white brightness increases.

Meanwhile, a method for increasing an amount of a dye that is used to dye a PVA film is used in the art so as to improve the contrast ratio, but the method has problems that the entire screen gets dark since the white brightness is reduced by the increased amount of dye.

As described above, the conventional methods have disadvantages that it is difficult to display a high-quality image having high brightness and high contrast ratio since the brightness and the contrast ratio are not improved at the same time.

DISCLOSURE OF INVENTION

Technical Problem

The present invention has been made to solve the foregoing problems with the prior art, and therefore an aspect of the present invention is to provide a liquid crystal display device having a high brightness and a high contrast ratio by providing a method for producing polarizer and a polarizing plate, both of which are able to improve brightness and contrast ratio at the same time.

Technical Solution

The present inventors have made repeated attempts to solve the above problems, and found that the orientation of a light-absorbing component, iodine, in a polarizing plate is improved when boric acid and a phosphate compound are added together in producing the polarizing plate, and therefore it is possible to improve both of the white brightness and the contrast ratio.

When the orientation of the light-absorbing components, i.e., molecular iodine or polyiodide ion species, in the polarizing plate is improved, the degree of polarization is increased, and therefore brightness of the light passed through two polarizing plates in cross, i.e., black brightness, becomes lower. That is to say, since the improved orientation of the light-absorbing components makes it possible to reduce the black brightness without a loss of the white brightness, it is possible to improve both of the brightness and contrast ratio in a screen.

In principle, the white brightness should be measured as brightness of the light penetrating two parallel polarizing plates, and the black brightness should be measured as brightness of the light penetrating two cross polarizing plates. For the present invention, optical properties of the polarizing plates are, however, determined by simply measuring the white brightness as transmission of the light passed through one polarizing plate (i.e., singleton transmittance) and the black brightness as transmission of the light passed through two cross polarizing plates (i.e., cross transmittance) for the sake of convenience.

According to an aspect of the present invention, there is provided a method for producing a polarizer having improved cross transmittance, the method including: dyeing polyvinyl alcohol (PVA)-based film with molecular iodine by immersing the PVA-based film in an aqueous iodine solution (dyeing step); absorbing the molecular iodine into the PVA-based film in an aqueous boric acid solution (cross-linking step); arranging the molecular iodine in the certain direction by stretching the PVA-based film in a certain direction (stretching step); adding a phosphate compound to the iodine aqueous solution or the aqueous boric acid solution so that a weight ratio of the phosphate compound to the boric acid is in a range of 1:0.1 to 1:10; and drying, in an oven, the PVA-based film in which the molecular iodine is oriented.

In this case, the adding of the phosphate compound may be carried out at the same time as at least one of the dyeing, cross-linking and stretching steps, and the phosphate compound may be at least one selected from the group consisting of phosphoric acid, calcium phosphate dibasic, magnesium phosphate dibasic, sodium phosphate monobasic, potassium phosphate monobasic and ammonium phosphate monobasic, and they may be used alone or in combinations thereof.

Also, According to another aspect of the present invention, there is provided a method for producing a polarizing plate by attaching protective films to both sides of the polarizer.

In addition, According to still another aspect of the present invention, there is provided a polarizing plate which is produced according to the method for producing a polarizing plate and includes boric acid and phosphate.

BEST MODE FOR CARRYING OUT THE INVENTION

Hereinafter, the methods for producing a polarizer and a polarizing plate according to the present invention will be described in more detail.

Production of Polarizer (1) Dyeing Step

This dyeing step is to dye a polyvinyl alcohol film with molecular iodine. For this purpose, the polyvinyl alcohol (PVA)-based film is immersed in an iodine aqueous solution in a dye bath to dye the PVA-based film with molecular iodine.

Generally, a temperature of the iodine aqueous solution is preferably in a range of 20 to 50° C., and an immersion time is preferably in a range of 10 to 300 seconds.

In this case, an iodine concentration of the iodine aqueous solution preferably is 0.01 to 0.5% by weight.

Also, the iodine aqueous solution may further include iodide/polyiodide ions such as iodide, triiodide, pentaiodide, and so on, and a solubilizing aid, such as potassium iodide, may be used as the iodide ions. The iodine aqueous solution according to the present invention preferably further includes 0.01 to 10% by weight of potassium iodide.

Also, the iodine aqueous solution according to the present invention preferably further includes 0.01 to 6% by weight of boric acid. The boric acid is not necessarily added to the iodine aqueous solution according to the present invention, but the boric acid may be added to facilitate the cross-linking of molecular iodine in an effective and fast manner. However, when a content of the boric acid exceeds 6% by weight, the boric acid may not be dissolved in water completely, depending on temperature.

When the PVA film dyed with molecular iodine is stretched, or the stretched PVA film is dyed with iodine, the molecular iodine is arranged in the direction that is parallel to the stretching direction of the PVA film. Since the iodine has high dichroicity, the PVA film absorbs the light vibrating in the stretching direction, and penetrates the light vibrating in the direction that is perpendicular to the stretching direction. As a result, a polarized light vibrating in a certain direction may be obtained from the natural light penetrated through the polarizing plate.

(2) Cross-linking Step

This cross-linking step is to absorb molecular iodine onto a polymeric matrix of the polyvinyl alcohol-based film. When the molecular iodine is not properly absorbed to the polymeric matrix, the polarizing plate may not perform its own functions since the degree of polarization is decreased. Generally, boric acid, borate and the like have been widely used as the cross-linking agent for the molecular iodine, but the boric acid is not necessarily used herein. However, it is necessary to use boric acid in the cross-linking step of the present invention. As described previously, when boric acid, and phosphate compounds as described later are added at a certain weight ratio, the orientation of the light-absorbing component is improved, which leads to an improved cross transmittance. The weight ratio of the boric acid and the phosphate compound is preferably in a range of approximately 1:0.1 to 1:10.

A dipping technique of dipping a PVA film dyed with molecular iodine in an aqueous boric acid solution is generally used as the cross-linking method, but a coating or spraying method may also be used herein.

Meanwhile, the aqueous boric acid solution preferably includes 2 to 15% by weight, and more preferably about 3 to 10% by weight of boric acid.

In addition to the boric acid, the aqueous boric acid solution preferably further includes 0.1 to 15% by weight of potassium iodide, based on 100 parts by weight of water. When the aqueous boric acid solution to which the potassium iodide is added in the content range is used herein, it is possible to obtain a faintly colored polarizer, i.e. a neutral grey polarizer that gives a substantially constant absorbance with respect to the entire wavelength range of a visible ray.

A temperature of the aqueous boric acid solution is 20° C. or above, and particularly preferably in a range of 30 to 85° C. The immersion time is generally in a range of 100 to 1200 seconds, and particularly preferably in a range of 200 to 500 seconds.

(3) Stretching Step

Stretching is to arrange molecular iodine in a certain direction, and this stretching step is carried out by stretching the PVA film in a certain direction. The stretching method is mainly divided into wet stretching method and dry stretching method. Here, the dry stretching method is sub-divided into an inter-roll stretching method, a heating roll stretching method, a compression stretching method, a tenter stretching method and the like, and the wet stretching method is sub-divided into a tenter stretching method and an inter-roll stretching method and the like. The wet and dry stretching methods may be all used in the present invention, and also be used in combination thereof, when necessary.

The stretching step may be carried out separately from or together with the dyeing step or the cross-linking step. The stretching step is preferably carried out in an iodine solution when this stretching step is carried out together with the dyeing step, and preferably carried out in an aqueous boric acid solution when this stretching step is carried out together with the cross-linking step.

(4) Step of Adding Phosphate Compound

The method for producing a polarizing plate according to the present invention is characterized in that boric acid and a phosphate compound are added to improve cross transmittance of a polarizing plate. The phosphate compound may be added, respectively, in the dyeing step, the cross-linking step and the stretching step, and it is preferable to add the phosphate compound in at least one of the above steps.

The phosphate compound may be added to the aqueous solution (an aqueous iodine solution or an aqueous boric acid solution) pre-prepared for each of the above-mentioned steps, or added together with iodine, potassium iodide or boric acid when the aqueous solution is prepared in each of the above-mentioned steps. In this case, an amount of the phosphate compound is preferably added 0.1 to 10 times in respect to the total amount of the boric acid added to the aqueous solution. That is to say, the phosphate compound is preferably added so that a weight of boric acid:a phosphate compound in the aqueous solution can be in a range of 1:0.1 to 1:10. As described later in Examples, the cross transmittance is not improved when the boric acid and phosphate compound are used alone, but the cross transmittance may be improved only when the boric acid and phosphate compound are added at a suitable weight ratio. The cross transmittance is slightly improved when the weight ratio of the phosphate compound is less than 0.1 times in respect to the total weight of the boric acid, whereas the phosphate compound may not be dissolved in water or the cross transmittance may be rather deteriorated when the weight ratio of the phosphate compound exceeds 10 times in respect to the total weight of the boric acid.

Meanwhile, the phosphate compound may be at least one selected from the group consisting of phosphoric acid, calcium phosphate dibasic, magnesium phosphate dibasic, sodium phosphate monobasic, potassium phosphate monobasic, ammonium phosphate monobasic and the like, and they may be used alone or in combinations thereof.

(5) Drying Step

When the above-mentioned steps are completed, the PVA film is put into an oven and dried to obtain a polarizer.

As described above, it is revealed that the polarizer, produced by adding the boric acid and the phosphate compound together, has a highly improved cross transmittance without a loss of the singleton transmittance. This is why the orientation of the light-absorbing component is improved through the addition of the boric acid and the phosphate compound. When the polarizer with improved orientation is used as described above, the white brightness is enhanced but the black brightness is not increased, and therefore it is possible to display an image having a high brightness and a high contrast ratio.

Production of Polarizing Plate

When the polarizer is dried completely, a polarizing plate is produced by laminating protective films onto both sides of the polarizer using an adhesive.

The term 'protective film' refers to a transparent film that is attached to both sides of a polarizer to protect the polarizer. Here, acetate-based resin film such as triacetyl cellulose (TAC), polyester-based resin film, polyether sulfone-based resin film, polycarbonate-based resin film, polyamide-based resin film, polyimide-based resin film, pololefin-based resin film may be sued as the protective film. Meanwhile, polyvinyl alcohol-based aqueous adhesive may be used as the adhesive.

MODE FOR THE INVENTION

Hereinafter, exemplary embodiments of the present invention will be described in detail. However, it should be understood that the detailed description and specific examples, while indicating preferred embodiments of the invention, are given by way of illustration only.

COMPARATIVE EXAMPLE 1

A polyvinyl alcohol film was immersed and dyed in an iodine aqueous solution including 0.1% by weight of iodine, 1% by weight of potassium iodide and 3% by weight of boric acid (A. dyeing step). The dyed polyvinyl alcohol film was immersed at 50° C. in 3% by weight of a boric acid solution including 5% by weight of potassium iodide, and stretched 5 times (B. cross-linking and stretching steps). The PVA polarizer prepared thus was put into an oven and dried at 80° C. for 5 minutes.

Next, a polarizing plate was produced by attaching TAC films (Fuji) to both sides of the PVA polarizer using a PVA adhesive.

COMPARATIVE EXAMPLE 2

A polarizing plate was produced in the same manner as Comparative example 1, except that the same equivalent amount of phosphoric acid was added instead of the added boric acid (Steps A and B) in the entire production process.

COMPARATIVE EXAMPLE 3

A polarizing plate was produced in the same manner as Comparative example 1, except that the same equivalent amount of magnesium phosphate dibasic was added instead of the added boric acid (Steps A and B) in the entire production process.

EXAMPLE 1

A polarizing plate was produced in the same manner as Comparative example 1, except that 1% of potassium phosphate monobasic was added to the aqueous iodine solution (boric acid:potassium phosphate monobasic=1:0.33) in the dyeing step (A).

EXAMPLE 2

A polarizing plate was produced in the same manner as Comparative example 1, except that 7% of potassium phosphate monobasic was further added to the aqueous boric acid solution (boric acid:potassium phosphate monobasic=1:2.33) in the cross-linking and stretching steps (B).

EXAMPLE 3

A polarizing plate was produced in the same manner as Comparative example 1, except that 5% by weight of ammonium phosphate monobasic was further added to the aqueous iodine solution in the dyeing steps (A), and 5% by weight of ammonium phosphate monobasic was added to the aqueous boric acid solution (boric acid:ammonium phosphate monobasic=1:1.66) in the cross-linking and stretching steps (B), based on the total weight of each of the aqueous solutions.

EXAMPLE 4

A polarizing plate was produced in the same manner as Comparative example 1, except that 3% by weight of phosphoric acid was added further to the aqueous boric acid solution (boric acid:phosphoric acid=1:1) in the cross-linking and stretching steps (B).

EXAMPLE 5

A polarizing plate was produced in the same manner as Comparative example 1, except that 0.5% by weight of phosphoric acid was added to the iodine aqueous solution in the dyeing step (A), and 0.5% by weight of phosphoric acid was added to the aqueous boric acid solution (boric acid:phosphoric acid=1:0.17) in the cross-linking and stretching steps (B).

EXAMPLE 6

A polarizing plate was produced in the same manner as Comparative example 1, except that 4% by weight of ammonium phosphate monobasic was added to the aqueous boric acid solution (boric acid:ammonium phosphate monobasic=1:1.33) in the cross-linking and stretching steps (B).

Meanwhile, the polarizers were produced according to the methods as described in the Comparative examples and the Examples, by adjusting a concentration of iodine in the iodine aqueous solution (Step A). In this case, all of the produced polarizers have an singleton transmittance of 42.0 to 42.5% and a color tone of—a=1.14 to 1.0 and b=2.5 to 3.5.

A cross transmittance of the polarizing plate prepared in the method of Comparative example 1 was set to Tc,o=1.0, and cross transmission ratios (=Tc/Tc,o) of the polarizing plates prepared in the methods of Comparative examples 2 to 3 and Examples 1 to 6 were then measured. The results are listed in the following Table 1. Herein, Tc represents the cross transmittance of each polarizing plate, and Tc,o represents that of the polarizing plate of Comparative example 1. The cross transmittance Tc of the polarizing plates of Examples and Comparative examples was measured under the same singleton transmittance (Ts.) condition. The fact that the cross transmittance is low in respect to the same singleton transmittance means that the orientation of the light-absorbing component is improved.

Two polarizing plates were cut at a cutting angle of 0° and 90° along the absorption axis, and the resulting two films were overlapped so that absorption axis of the two films can form a right angle, and the cross transmittance (Tc) was then measured using a transmission spectroscope, N&K analyzer (N&K Technology Inc.).

TABLE 1

| Cross Transmission Ratio | |
|---|---|
| Comparative example 1 | 1.00 |
| Comparative example 2 | 1.50 |
| Comparative example 3 | 1.43 |
| Example 1 | 0.72 |
| Example 2 | 0.81 |
| Example 3 | 0.65 |
| Example 4 | 0.75 |
| Example 5 | 0.55 |
| Example 6 | 0.48 |

As listed in Table 1, it was revealed that the cross transmittances of the polarizing plates of the Examples, which were produced by adding boric acid and a phosphate compound at a certain weight ratio, are improved, compared to the polarizing plates of the Comparative examples, when the polarizing plates of the Examples and Comparative example are measured for cross transmittance in respect to the same singleton transmittance. Meanwhile, it was seen that the cross transmittance is rather degraded as in the Comparative examples 2 and 3 in the case of the polarizing plates prepared by adding only the phosphate compound without the addition of boric acid.

INDUSTRIAL APPLICABILITY

As described above, the method for producing a polarizer according to the present invention may be useful to improve the orientation of the components that absorb the light by adding boric acid and a phosphate compound at a certain ratio to produce a polarizer. Therefore, the method according to the present invention may be useful to provide a high-brightness LCD panel having excellent contrast ratio by decreasing a cross transmittance value without a loss of the singleton transmittance.

The invention claimed is:

1. A method for producing a polarizer having improved cross transmittance, the method comprising:
    a dyeing step of dyeing a polyvinyl alcohol (PVA)-based film with molecular iodine by immersing the PVA-based film in an aqueous iodine solution;
    a cross-linking step of absorbing the molecular iodine into the PVA- based film using an aqueous boric acid solution;
    a stretching step of arranging the molecular iodine in the certain direction by stretching the PVA-based film in a certain direction;
    adding a phosphate compound to the iodine aqueous solution of the dyeing step or the aqueous boric acid solution so that a weight ratio of the phosphate compound to the boric acid is in a range of 1:0.1 to 1:10; and
    drying, in an oven, the PVA-based film in which the molecular iodine is oriented.

2. The method of claim 1, wherein a concentration of the iodine aqueous solution is 0.01 to 0.5% by weight.

3. The method of claim 1, wherein the iodine aqueous solution further comprises 0.01 to 10% by weight of potassium iodide.

4. The method of claim 1, wherein the iodine aqueous solution further comprises 0.01 to 6% by weight of boric acid.

5. The method of claim 1, wherein a concentration of the aqueous boric acid solution is 2 to 15% by weight of boric acid.

6. The method of claim 1, wherein the aqueous boric acid solution further comprises 0.1 to 15% by weight of potassium iodide.

7. The method of claim 1, wherein the adding of a phosphate compound is carried out at the same time as at least one of the dyeing, cross-linking and stretching steps.

8. The method of claim 1, wherein the phosphate compound is at least one selected from the group consisting of phosphoric acid, calcium phosphate dibasic, magnesium phosphate dibasic, sodium phosphate monobasic, potassium phosphate monobasic and ammonium phosphate monobasic, and is used alone or in combinations thereof.

9. A polarizer produced according to the method as defined in any one of claim 1 to 8.

10. A method for producing a polarizing plate, comprising: attaching protective films to both sides of a polarizer produced according to the method as defined in claim 1.

11. A polarizing plate produced according to the method as defined in claim 10.

* * * * *